(12) United States Patent
He et al.

(10) Patent No.: US 8,705,616 B2
(45) Date of Patent: Apr. 22, 2014

(54) PARALLEL MULTIPLE BITRATE VIDEO ENCODING TO REDUCE LATENCY AND DEPENDENCES BETWEEN GROUPS OF PICTURES

(75) Inventors: Yaming He, Redmond, WA (US); Florin Folta, Redmond, WA (US); Chun-Wei Chan, Mountain View, CA (US); Stacey Spears, Sammamish, WA (US); Chuang Gu, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 175 days.

(21) Appl. No.: 12/814,060

(22) Filed: Jun. 11, 2010

(65) Prior Publication Data

US 2011/0305273 A1 Dec. 15, 2011

(51) Int. Cl.
*H04N 11/02* (2006.01)

(52) U.S. Cl.
USPC ...................................... 375/240.02

(58) Field of Classification Search
USPC ...................................... 375/240.02
See application file for complete search history.

(56) References Cited

U.S. PATENT DOCUMENTS

| | | | |
|---|---|---|---|
| 4,142,071 A | 2/1979 | Croisier et al. |
| 4,216,354 A | 8/1980 | Esteban et al. |
| 4,464,783 A | 8/1984 | Beraud et al. |
| 5,243,420 A | 9/1993 | Hibi |
| 5,381,143 A | 1/1995 | Shimoyoshi et al. |
| 5,416,521 A | 5/1995 | Chujoh et al. |
| 5,418,570 A | 5/1995 | Ueno et al. |
| 5,436,665 A | 7/1995 | Ueno et al. |
| 5,454,011 A | 9/1995 | Shimoyoshi |
| 5,463,424 A | 10/1995 | Dressler |
| 5,537,440 A | 7/1996 | Eyuboglu et al. |
| 5,541,852 A | 7/1996 | Eyuboglu et al. |
| 5,544,266 A | 8/1996 | Koppelmans et al. |

(Continued)

FOREIGN PATENT DOCUMENTS

| | | |
|---|---|---|
| EP | 0 909 094 | 4/1999 |
| EP | 1 195 992 | 4/2002 |

(Continued)

OTHER PUBLICATIONS

Akramullah et al., "Parallelization of MPEG-2 Video Encoder for Parallel and Distributed Computing Systems," *IEEE*, pp. 834-837 (Aug. 1995).

(Continued)

*Primary Examiner* — Dave Czekaj
*Assistant Examiner* — Leron Beck
(74) *Attorney, Agent, or Firm* — Bryan Webster; Andrew Sanders; Micky Minhas

(57) ABSTRACT

A multiple bitrate (MBR) video encoding management tool utilizes available processing units for parallel MBR video encoding. Instead of focusing only on multi-threading of encoding tasks for a single picture or group of pictures (GOP), the management tool parallelizes the encoding of multiple GOPs between different processing units and/or different computing systems. With this parallel MBR video encoding architecture, different GOPs can be encoded in parallel. To facilitate such parallel encoding, data dependencies between GOPs are removed. The management tool can adjust the number of GOPs to encode in parallel on a computing system so as to favor parallelism of encoding for different GOPs at the expense of parallelism of encoding inside a GOP, or vice versa, and thereby set a suitable balance between encoding latency and throughput.

17 Claims, 6 Drawing Sheets

(56) References Cited

U.S. PATENT DOCUMENTS

| | | |
|---|---|---|
| 5,617,142 A | 4/1997 | Hamilton |
| 5,623,424 A | 4/1997 | Azadegan et al. |
| 5,659,660 A | 8/1997 | Plenge et al. |
| 5,677,735 A | 10/1997 | Ueno et al. |
| 5,835,495 A | 11/1998 | Ferriere |
| 5,970,173 A | 10/1999 | Lee et al. |
| 5,995,151 A | 11/1999 | Naveen et al. |
| 6,044,089 A | 3/2000 | Ferriere |
| 6,084,909 A | 7/2000 | Chiang et al. |
| 6,192,075 B1 | 2/2001 | Jeng |
| 6,192,154 B1 | 2/2001 | Rajagopalan et al. |
| 6,249,288 B1 | 6/2001 | Campbell |
| 6,259,741 B1 | 7/2001 | Chen et al. |
| 6,278,691 B1 | 8/2001 | Ohyama et al. |
| 6,278,735 B1 | 8/2001 | Mohsenian |
| 6,370,502 B1 | 4/2002 | Wu et al. |
| 6,393,059 B1 | 5/2002 | Sugiyama |
| 6,404,814 B1 | 6/2002 | Apostolopoulos et al. |
| 6,426,977 B1 | 7/2002 | Lee et al. |
| 6,434,197 B1 | 8/2002 | Wang et al. |
| 6,463,414 B1 | 10/2002 | Su et al. |
| 6,466,623 B1 | 10/2002 | Youn et al. |
| 6,496,216 B2 | 12/2002 | Feder |
| 6,496,868 B2 | 12/2002 | Krueger et al. |
| 6,504,494 B1 | 1/2003 | Dyas et al. |
| 6,507,615 B1 | 1/2003 | Tsujii et al. |
| 6,522,693 B1 | 2/2003 | Lu et al. |
| 6,526,099 B1 | 2/2003 | Christopoulos et al. |
| 6,529,552 B1 | 3/2003 | Tsai et al. |
| 6,647,061 B1 | 11/2003 | Panusopone et al. |
| 6,650,705 B1 | 11/2003 | Vetro et al. |
| 6,678,654 B2 | 1/2004 | Zinser, Jr. et al. |
| 6,728,317 B1 | 4/2004 | Demos |
| 6,757,648 B2 | 6/2004 | Chen et al. |
| 6,823,008 B2 | 11/2004 | Morel |
| 6,925,501 B2 | 8/2005 | Wang et al. |
| 6,931,064 B2 | 8/2005 | Mori et al. |
| 6,934,334 B2 | 8/2005 | Yamaguchi et al. |
| 6,937,653 B2 | 8/2005 | Song et al. |
| 6,944,224 B2 | 9/2005 | Zhao |
| 6,961,377 B2 | 11/2005 | Kingsley |
| 6,963,347 B1 | 11/2005 | Selvaggi et al. |
| 7,027,982 B2 | 4/2006 | Chen et al. |
| 7,039,116 B1 | 5/2006 | Zhang et al. |
| 7,058,127 B2 | 6/2006 | Lu et al. |
| 7,068,718 B2 | 6/2006 | Kim et al. |
| 7,085,322 B2 | 8/2006 | Ngai et al. |
| 7,116,714 B2 | 10/2006 | Hannuksela |
| 7,142,601 B2 | 11/2006 | Kong et al. |
| 7,292,634 B2 | 11/2007 | Yamamoto et al. |
| 7,295,612 B2 | 11/2007 | Haskell |
| 7,319,720 B2 | 1/2008 | Abrams, Jr. |
| 7,336,720 B2 | 2/2008 | Martemyanov et al. |
| 7,343,291 B2 | 3/2008 | Thumpudi |
| 7,346,106 B1 | 3/2008 | Jiang et al. |
| 7,352,808 B2 | 4/2008 | Ratakonda et al. |
| 7,643,422 B1 | 1/2010 | Covell et al. |
| 7,694,075 B1* | 4/2010 | Feekes, Jr. .................. 711/119 |
| 7,773,672 B2 | 8/2010 | Prieto et al. |
| 7,840,078 B2 | 11/2010 | Segall |
| 7,885,341 B2 | 2/2011 | Chen et al. |
| 7,936,820 B2 | 5/2011 | Watanabe et al. |
| 8,130,828 B2 | 3/2012 | Hsu et al. |
| 2002/0036707 A1 | 3/2002 | Gu |
| 2002/0080877 A1 | 6/2002 | Lu et al. |
| 2002/0090027 A1 | 7/2002 | Karczewicz et al. |
| 2002/0131492 A1* | 9/2002 | Yokoyama ............... 375/240.03 |
| 2002/0136298 A1 | 9/2002 | Anantharamu |
| 2002/0172154 A1 | 11/2002 | Uchida et al. |
| 2002/0181584 A1 | 12/2002 | Alexandre et al. |
| 2003/0185298 A1 | 10/2003 | Alvarez et al. |
| 2003/0206597 A1 | 11/2003 | Kolarov et al. |
| 2003/0227974 A1 | 12/2003 | Nakamura et al. |
| 2004/0117427 A1 | 6/2004 | Allen et al. |
| 2004/0125877 A1 | 7/2004 | Chang |
| 2004/0136457 A1 | 7/2004 | Funnell et al. |
| 2004/0165667 A1 | 8/2004 | Lennon et al. |
| 2004/0234142 A1 | 11/2004 | Chang et al. |
| 2004/0264489 A1 | 12/2004 | Klemets et al. |
| 2005/0041740 A1 | 2/2005 | Sekiguchi |
| 2005/0053157 A1 | 3/2005 | Lillevold |
| 2005/0075869 A1 | 4/2005 | Gersho et al. |
| 2005/0084007 A1 | 4/2005 | Lightstone et al. |
| 2005/0123058 A1 | 6/2005 | Greenbaum et al. |
| 2005/0165611 A1 | 7/2005 | Mehrotra et al. |
| 2005/0169545 A1 | 8/2005 | Ratakonda et al. |
| 2005/0175091 A1 | 8/2005 | Puri et al. |
| 2005/0180511 A1 | 8/2005 | Arafune et al. |
| 2005/0207497 A1 | 9/2005 | Rovati et al. |
| 2005/0228854 A1* | 10/2005 | Steinheider et al. .......... 709/200 |
| 2005/0232419 A1 | 10/2005 | Yogeshwar et al. |
| 2006/0002479 A1 | 1/2006 | Fernandes |
| 2006/0114995 A1 | 6/2006 | Robey et al. |
| 2006/0120610 A1 | 6/2006 | Kong et al. |
| 2006/0126726 A1 | 6/2006 | Lin et al. |
| 2006/0126744 A1 | 6/2006 | Peng et al. |
| 2006/0159169 A1 | 7/2006 | Hui et al. |
| 2006/0215754 A1 | 9/2006 | Buxton et al. |
| 2006/0222078 A1 | 10/2006 | Raveendran |
| 2006/0239343 A1 | 10/2006 | Mohsenian |
| 2006/0245491 A1 | 11/2006 | Jam et al. |
| 2006/0248516 A1 | 11/2006 | Gordon |
| 2006/0262844 A1 | 11/2006 | Chin |
| 2007/0039028 A1 | 2/2007 | Bar |
| 2007/0053444 A1 | 3/2007 | Shibata et al. |
| 2007/0058718 A1 | 3/2007 | Shen et al. |
| 2007/0058729 A1 | 3/2007 | Yoshinari |
| 2007/0071105 A1 | 3/2007 | Tian et al. |
| 2007/0140352 A1 | 6/2007 | Bhaskaran et al. |
| 2007/0153906 A1* | 7/2007 | Petrescu et al. .......... 375/240.24 |
| 2007/0160128 A1* | 7/2007 | Tian et al. ...................... 375/240 |
| 2007/0223564 A1 | 9/2007 | Bruls et al. |
| 2007/0280349 A1 | 12/2007 | Prieto et al. |
| 2008/0046939 A1 | 2/2008 | Lu et al. |
| 2008/0137736 A1 | 6/2008 | Richardson et al. |
| 2008/0144723 A1 | 6/2008 | Chen et al. |
| 2008/0151101 A1 | 6/2008 | Tian et al. |
| 2008/0165844 A1 | 7/2008 | Karczewicz |
| 2008/0165864 A1 | 7/2008 | Eleftheriadis et al. |
| 2008/0187046 A1 | 8/2008 | Joch |
| 2008/0259921 A1 | 10/2008 | Nadarajah |
| 2009/0003452 A1 | 1/2009 | Au et al. |
| 2009/0012982 A1* | 1/2009 | Merchia et al. ............... 707/101 |
| 2009/0033739 A1 | 2/2009 | Sarkar et al. |
| 2009/0110060 A1 | 4/2009 | Cortes et al. |
| 2009/0147859 A1 | 6/2009 | McGowan et al. |
| 2009/0176454 A1* | 7/2009 | Chen et al. ................... 455/63.1 |
| 2009/0201990 A1 | 8/2009 | Leprovost et al. |
| 2009/0219993 A1 | 9/2009 | Bronstein et al. |
| 2009/0225870 A1 | 9/2009 | Narasimhan |
| 2009/0244633 A1* | 10/2009 | Johnston ...................... 358/3.23 |
| 2009/0279605 A1 | 11/2009 | Holcomb et al. |
| 2009/0282162 A1 | 11/2009 | Mehrotra et al. |
| 2010/0086048 A1 | 4/2010 | Ishtiaq et al. |
| 2010/0091837 A1 | 4/2010 | Zhu et al. |
| 2010/0091888 A1 | 4/2010 | Nemiroff |
| 2010/0142622 A1 | 6/2010 | Le Leannec et al. |
| 2010/0189179 A1 | 7/2010 | Gu et al. |
| 2010/0189183 A1 | 7/2010 | Gu et al. |
| 2010/0208795 A1 | 8/2010 | Hsiang |
| 2010/0272171 A1 | 10/2010 | Xu |
| 2010/0316126 A1 | 12/2010 | Chen et al. |
| 2010/0316134 A1 | 12/2010 | Chen et al. |
| 2011/0188577 A1* | 8/2011 | Kishore et al. ........... 375/240.16 |
| 2012/0056981 A1 | 3/2012 | Tian et al. |

FOREIGN PATENT DOCUMENTS

| | | |
|---|---|---|
| JP | 3032088 | 4/2000 |
| JP | 2002-152752 | 5/2002 |
| JP | 9214965 | 6/2002 |
| JP | 2003-259307 | 9/2003 |
| JP | 2005-252555 | 9/2005 |
| JP | 2007-036666 | 2/2007 |

(56) References Cited

FOREIGN PATENT DOCUMENTS

| | | |
|---|---|---|
| JP | 2007-295423 | 11/2007 |
| KR | 10-2005-0089720 | 9/2005 |
| KR | 10-2008-0102141 | 11/2008 |
| WO | WO 01/95633 | 12/2001 |
| WO | WO 02/054774 A2 | 7/2002 |
| WO | WO 2004/004359 | 1/2004 |
| WO | WO 2004/025405 A2 | 3/2004 |
| WO | WO 2006/096612 | 9/2006 |
| WO | WO 2006/134110 | 12/2006 |
| WO | WO 2010/088030 | 8/2010 |

OTHER PUBLICATIONS

ATI Technologies, Inc., "Introduction to H.264," 6 pp. (month unknown, 2005).

Chen et al., "Implementation of H.264 Encoder and Decoder on Personal Computers," *Journal of Visual Comm. and Image Representation*, 19 pp. (Apr. 2006).

Chen, "Synchronization and Control of Multi-threads for MPEG-4 Video Decoder," *IEEE 1999 Int'l Conf. on Consumer Electronics*, pp. 298-299 (Jun. 1999).

Dawson, "Coding for Multiple Cores on Xbox 360 and Microsoft Windows," 8 pp. (Aug. 2006) [Downloaded from the Internet on Jan. 22, 2007].

Duffy, "CLR Inside Out: Using Concurrency for Scalability," MSDN Magazine, 11 pp. (Sep. 2006) [Downloaded from the Internet on Jan. 22, 2007].

foldoc.org, "priority scheduling," 1 p. (no date) [Downloaded from the Internet on Jan. 26, 2007].

foldoc.org, "multitasking," 1 p. (Document dated Apr. 24, 1998) [Downloaded from the Internet on Jan. 26, 2007].

Gerber et al., "Optimizing Video Encoding using Threads and Parallelism: Part 1—Threading a video codec," 3 pp., downloaded from Embedded.com, (Dec. 2009).

Intel Corp., "Intel's Next Generation Integrated Graphics Architecture—Intel® Graphics Media Accelerator X3000 and 3000," 14 pp. (Jul. 2006).

Jacobs et al., "Thread-Parallel MPEG-2, MPEG-4 and H.264 Video Encoders for SoC Multi-Processor Architectures," *IEEE Trans. on Consumer Electronics*, vol. 52, No. 1, pp. 269-275 (Feb. 2006).

Kim et al., "Multi-thread VLIW processor architecture for HDTV decoding," *IEEE 2000 Custom Integrated Circuits Conf.*, pp. 559-562 (May 2000).

Loomis et al., "VC-1 Technical Overview," 7 pp. (Apr. 2006) [Downloaded from the Internet on Jan. 24, 2007].

Oehring et al., "MPEG-2 Video Decompression on Simultaneous Multithreaded Multimedia," *Int. Conf. on Parallel Architectures and Compilation Techniques (PACT '99)*, Newport Beach, CA (Oct. 1999).

Ostermann et al., "Video Coding with H.264/AVC: Tools, Performance, and Complexity," *IEEE Circuits and Systems Magazine*, pp. 7-28 (Aug. 2004).

Sambe et al., "High-speed Distributed Video Transcoding for Multiple Rates and Formats," *IEICE Trans on Information and Systems*, vol. E88-D, Issue 8, pp. 1923-1931 (Aug. 2005).

SMPTE, "Proposed SMPTE Standard for Television: VC-1 Compressed Video Bitstream Format and Decoding Process," SMPTE 421M, pp. i-xx, 5-7, 23-27 (Aug. 2005).

Van Der Tol et al., "Mapping of MPEG-4 decoding on a flexible architecture platform," *Proceedings of the SPIE, Media Processors*, vol. 4674, 13 pp. (Jan. 2002).

Van Der Tol et al., "Mapping of H.264 decoding on a multiprocessor architecture," *Proceedings of the SPIE*, vol. 5022, pp. 707-718 (May 2003).

U.S. Appl. No. 60/341,674, filed Dec. 17, 2001, Lee et al.

Asbun et al., "Very Low Bit Rate Wavelet-Based Scalable Video Compression," *Proc. Int'l Conf. on Image Processing*, vol. 3, pp. 948-952 (Oct. 1998).

U.S. Appl. No. 60/488,710, filed Jul. 18, 2003, Srinivasan et al.

U.S. Appl. No. 60/501,081, filed Sep. 7, 2003, Srinivasan et al.

U.S. Appl. No. 60/501,133, filed Sep. 7, 2003, Holcomb et al.

Assuncao et al., "A Frequency-Domain Video Transcoder for Dynamic Bit-Rate Reduction of MPEG-2 Bit Streams," IEEE Transactions on Circuits and Systems for Video Technology, vol. 8, No. 8, pp. 953-967 (Dec. 1998).

Assuncao et al., "Buffer Analysis and Control in CBR Video Transcoding," *IEEE Transactions on Circuits and Systems for Video Technology*, vol. 10, No. 1, pp. 83-92 (Feb. 2000).

Assuncao et al., "Transcoding of Single-Layer MPEG Video Into Lower Rates," *IEE Proc.—Vis. Image Signal Process.*, vol. 144, No. 6, pp. 377-383 (Dec. 1997).

Braun et al., "Motion-Compensating Real-Time Format Converter for Video on Multimedia Displays," *Proceedings IEEE 4th International Conference on Image Processing (ICIP-97)*, vol. I, pp. 125-128 (Oct. 1997).

Brightwell et al., "Flexible Switching and Editing of MPEG-2 Video Bitstreams," *IBC-97*, 11 pp. (Sep. 1997).

Chang et al., "Real-Time Content-Based Adaptive Streaming of Sports Videos," *IEEE*, pp. 139-146 (Jul. 2001).

Crooks, "An Analysis of MPEG Encoding Techniques on Picture Quality," *Tektronix Application Note*, 11 pp. (Jun. 1998).

Dipert, "Image Compression Article Addendum," *EDN Magazine*, 8 pp. (Jun. 18, 1998).

Flordal et al., "Accelerating CABAC Encoding for Multi-standard Media with Configurability," IEEE Xplore, 8 pp. (Apr. 2006).

Fogg, "Question That Should Be Frequently Asked About MPEG," Version 3.8, 46 pp. (Apr. 1996).

Gibson et al., *Digital Compression for Multimedia*, "Chapter 4: Quantization," Morgan Kaufman Publishers, Inc., pp. 113-138 (Jan. 1998).

Gibson et al., *Digital Compression for Multimedia*, "Chapter 7: Frequency Domain Coding," Morgan Kaufman Publishers, Inc., pp. 227-262 (Jan. 1998).

Gill, "Tips and Tricks for Encoding Long Format Content with Windows Media Encoder," downloaded from World Wide Web, 12 pp. (document marked Aug. 2003).

Hamming, *Digital Filters*, Second Edition, "Chapter 2: The Frequency Approach," Prentice-Hall, Inc., pp. 19-31 (Jan. 1983).

Huang et al., "Optimal Control of Multiple Bit Rates for Streaming Media," *Proc. Picture Coding Symposium*, 4 pp. (Dec. 2004).

ISO/IEC, "ISO/IEC 11172-2, Information Technology—Coding of Moving Pictures and Associated Audio for Digital Storage Media at up to about 1.5 Mbit/s—Part 2: Video," 112 pp. (Aug. 1993).

ISO/IEC, "JTC1/SC29/WG11 N2202, Information Technology—Coding of Audio-Visual Objects: Visual, ISO/IEC 14496-2," 329 pp. (Mar. 1998).

ISO/IEC MPEG-2 Test Model 5, "TM5 Overview," 10 pp. (Mar. 1993).

Ito et al., "Rate control for video coding using exchange of quantization noise and signal resolution," Electronics & Communications in Japan, Part II, Hoboken, New Jersey, vol. 83, No. 1, Jan. 1, 2000, pp. 33-43.

ITU-T, "ITU-T Recommendation H.261, Video Codec for Audiovisual Services at $p\times$ 64 kbits," 25 pp. (Mar. 1993).

ITU-T, "ITU-T Recommendation H.262, Information Technology—Generic Coding of Moving Pictures and Associated Audio Information: Video," 205 pp. (Jul. 1995).

ITU-T, "ITU-T Recommendation H.263, Video Coding for Low Bit Rate Communication," 162 pp. (Feb. 1998).

Joint Video Team (JVT) of ISO/IEC MPEG & ITU-T VCEG, "Joint Final Committee Draft (JFCD) of Joint Video Specification," JVT-D157, 207 pp. (Aug. 2002).

Kamikura et al., "Global Brightness-Variation Compensation for Video Coding" *IEEE Trans. on Circuits and Systems for Video Technology*, vol. 8, No. 8, pp. 988-1000 (Dec. 1998).

Kari et al., "Intensity controlled motion compensation," *Data Compression Conference Proc.*, pp. 249-258, (Mar. 30-Apr. 1, 1998).

Keesman et al., "Transcoding of MPEG Bitstreams," *Signal Processing: Image Communication 8*, pp. 481-500 (Sep. 1996).

(56) References Cited

OTHER PUBLICATIONS

Khan et al., "Architecture Overview of Motion Vector Reuse Mechanism in MPEG-2 Transcoding," Technical Report TR2001-01-01, 7 pp. (Jan. 2001).
Knee et al., "Seamless Concatenation—A 21st Century Dream," 13 pp. (Jun. 1997).
Lei et al., "Rate Adaptation Transcoding for Precoded Video Streams," 13 pp. (month unknown, 2000).
Leventer et al., "Towards Optimal Bit-Rate Control in Video Transcoding," *ICIP*, pp. 265-268 (Sep. 2003).
Microsoft Corporation, "Microsoft Debuts New Windows Media Player 9 Series, Redefining Digital Media on the PC," 4 pp. (Sep. 4, 2002) [Downloaded from the World Wide Web on May 14, 2004].
Microsoft Corporation, "Windows Media and Web Distribution for Broadcasters," downloaded from the World Wide Web, 4 pp. (document marked Sep. 2007).
Miyata et al., "A novel MPEG-4 rate control method with spatial resolution conversion for low bit-rate coding," Conference Proceedings / IEEE International Symposium on Circuits and Systems (ISCAS), Kobe, Japan, May 23-26, 2005, pp. 4538-4541.
Mook, "Next-Gen Windows Media Player Leaks to the Web," *BetaNews*, 17 pp. (Jul. 2002) [Downloaded from the World Wide Web on Aug. 8, 2003].
Moshnyaga, "An Implementation of Data Reusable MPEG Video Coding Scheme," *Proceedings of World Academy of Science, Engineering and Technology*, vol. 2, pp. 193-196 (Jan. 2005).
Moshnyaga, "Reduction of Memory Accesses in Motion Estimation by Block-Data Reuse," *ICASSP '02 Proceedings, IEEE International Conference on Acoustics, Speech, and Signal Processing*, vol. 3, pp. III-3128-III-3131 (May 2002).
Nasim et al., "Architectural Optimizations for Software-Bassed MPEG4 Video Encoder," *13th European Signal Processing Conference: EUSIPCO '2005*, 4 pp. (Sep. 2005).
Nuntius Systems, Inc., "H.264—a New Technology for Video Compression", downloaded from the World Wide Web, 4 pp. (document marked Mar. 2004).
Ozcelebi et al., "Optimal rate and input format control for content and context adaptive video streaming," 2004 International Conference on Image Processing (ICIP), Singapore, Oct. 24-27, 2004, pp. 2043-2046.
Ozcelebi et al., "Optimal rate and input format control for content and context adaptive streaming of sports videos," 2004 IEEE 6th Workshop on Multimedia Signal Processing, Siena, Italy, Sep. 29-Oct. 1, 2004, pp. 502-505.
Printouts of FTP directories from http://ftp3.itu.ch, 8 pp. [Downloaded from the World Wide Web on Sep. 20, 2005].
Reader, "History of MPEG Video Compression—Ver. 4.0," 99 pp. [Document marked Dec. 16, 2003].
RealNetworks, Inc., "Chapter 5: Producing Video," downloaded from the World Wide Web, 22 pp. (document marked 2004).
Reed et al., "Optimal multidimensional bit-rate control for video communication," IEEE Transactions on Image Processing, vol. 11, No. 8, pp. 873-874 (Aug. 1, 2002).
Roy et al., "Application Level Hand-off Support for Mobile Media Transcoding Sessions," *Proceedings of the 12th International Workshop on Network and Operating Systems Support for Digital Audio and Video*, 22 pp. (May 2002).
Senda et al., "A Realtime Software MPEG Transcoder Using a Novel Motion Vector Reuse and a SIMD Optimization Techniques," *ICASSP '99 Proceedings, 1999 IEEE International Conference on Acoustics, Speech, and Signal Processing*, vol. 4, pp. 2359-2362 (Mar. 1999).
Shanableh et al., "Heterogeneous Video Transcoding to Lower Spatio-Temporal Resolutions and Different Encoding Formats," *IEEE Transactions on Multimedia*, 31 pp. (Jun. 2000).
Shanableh et al., "Transcoding of Video Into Different Encoding Formats," *ICASSP-2000 Proceedings*, vol. IV of VI, pp. 1927-1930 (Jun. 2000).
SMPTE, "SMPTE 327M-2000—MPEG-2 Video Recoding Data Set," 9 pp. (Jan. 2000).
Sun et al., "Architectures for MPEG Compressed Bitstream Scaling," *IEEE Transactions on Circuits and Systems for Video Technology*, vol. 6, No. 2, pp. 191-199 (Apr. 1996).
Sun et al., "Lossless Coders," *Digital Signal Processing for Multimedia Systems*, Chapter 15, pp. 385-416 (Mar. 1999).
Swann et al., "Transcoding of MPEG-II for Enhanced Resilience to Transmission Errors," *Cambridge University Engineering Department*, Cambridge, UK, pp. 1-4 (Sep. 1996).
Takahashi et al., "Motion Vector Synthesis Algorithm for MPEG2-to-MPEG4 Transcoder," *Proc. of SPIE*, vol. 4310, pp. 872-882 (Jan. 2001).
Tan et al., "On the Methods and Performances of Rational Downsizing Video Transcoding," *Signal Processing: Image Communication 19*, pp. 47-65 (Jan. 2004).
Tektronix Application Note, "Measuring and Interpreting Picture Quality in MPEG Compressed Video Content," 8 pp. (2001).
Tsai et al., "Rate-Distortion Model for Motion Prediction Efficiency in Scalable Wavelet Video Coding," *17th International Packet Video Workshop*, 9 pp. (May 2009).
Tudor et al., "Real-Time Transcoding of MPEG-2 Video Bit Streams," *BBC R&D*, U.K., 6 pp. (Sep. 1997).
Vetro et al., "Complexity-Quality Analysis of Transcoding Architectures for Reduced Spatial Resolution," *IEEE Transactions on Consumer Electronics*, 9 pp. (Aug. 2002).
Vishwanath et al., "A VLSI Architecture for Real-Time Hierarchical Encoding/Decoding of Video Using the Wavelet Transform," *Proc. ICASSP*, 5 pp. (Apr. 1994).
Waggoner, "In Depth Microsoft Silverlight," downloaded from the World Wide Web, 94 pp. (document marked 2007).
Watkinson, *The MPEG Handbook*, pp. 275-281 (Nov. 2004).
Werner, "Generic Quantiser for Transcoding of Hybrid Video," *Proc. 1997 Picture Coding Symposium*, Berlin, Germany, 6 pp. (Sep. 1997).
Werner, "Requantization for Transcoding of MPEG-2 Intraframes," *IEEE Transactions on Image Processing*, vol. 8, No. 2, pp. 179-191 (Feb. 1999).
Wiegand et al., "Overview of the H.264/AVC Coding Standard," *IEEE Trans. on Circuits and Systems for Video Technology*, vol. 13, No. 7, pp. 560-576 (Jul. 2003).
Youn et al., "Video Transcoder Architectures for Bit Rate Scaling of H.263 Bit Streams," *ACM Multimedia 1999*, Orlando, Florida, pp. 243-250 (Oct. 1999).
Zhou et al., "Motion Vector Reuse Algorithm to Improve Dual-Stream Video Encoder," *ICSP 2008, 9th International Conference on Signal Processing*, pp. 1283-1286 (Oct. 2008).
Chen et al., "Bandwidth-Efficient Encoder Framework for H.264/AVC Scalable Extension," IEEE Int'l Symp. on Multimedia Workshops, pp. 401-406 (2007).
Detti et al., "SVEF: an Open-Source Experimental Evaluation Framework for H.264 Scalable Video Streaming," IEEE Symp. on Computers and Communications, pp. 36-41 (2009).
ITU-T, "ITU-T Recommendation H.264, Advanced video coding for generic audiovisual services," 676 pp. (Mar. 2010).
Kofler et al., "Improving IPTV Services by H.264/SVC Adaptation and Traffic Control," IEEE Int'l Symp. on Broadband Multimedia Systems and Broadcasting, 6 pp. (2009).
Microsoft Corporation, "Microsoft Lync—Unified Communication Specification for H.264 AVC and SVC UCConfig Modes V 1.1," 37 pp. (Jun. 2011).
Microsoft Corporation, "Microsoft Lync—Unified Communication Specification for H.264 AVC and SVC Encoder Implementation V 1.01," 32 pp. (Jan. 2011).
Ortiz Murillo et al., "Towards User-driven Adaptation of H.264/SVC Streams," European Conf. on Interactive TV and Video, 4 pp. (2010).
Schwarz et al., "Overview of the Scalable Video Coding Extension of the H.264/AVC Standard," IEEE Trans. on Circuits and Systems for Video Technology, vol. 17, No. 9, pp. 1103-1120 (Sep. 2007).

(56) References Cited

OTHER PUBLICATIONS

Sullivan et al., "DirectX Video Acceleration (DXVA) Specification for H.264/MPEG-4 Scalable Video Coding (SVC) Off-Host VLD Mode Decoding," 24 pp. (Jun. 2012).

Sullivan, "DirectX Video Acceleration Specification for H.264/AVC Decoding," 66 pp. (Dec. 2007, updated Dec. 2010).

Sullivan et al., "DirectX Video Acceleration Specification for H.264/MPEG-4 AVC Multiview Video Coding (MVC), Including the Stereo High Profile," 17 pp. (Mar. 2011).

Zhu et al., "Rate Control Scheme for Temporal Scalability of H.264/SVC Based on New Rate Distortion Model," Journal of Convergence Information Technology, vol. 6, No. 1, pp. 24-33 (Jan. 2011).

European Search Report dated Dec. 19, 2013, European Application No. 10736179.2, 13 pages.

\* cited by examiner software 180 implementing MBR video encoding management tool and/or MBR video encoding

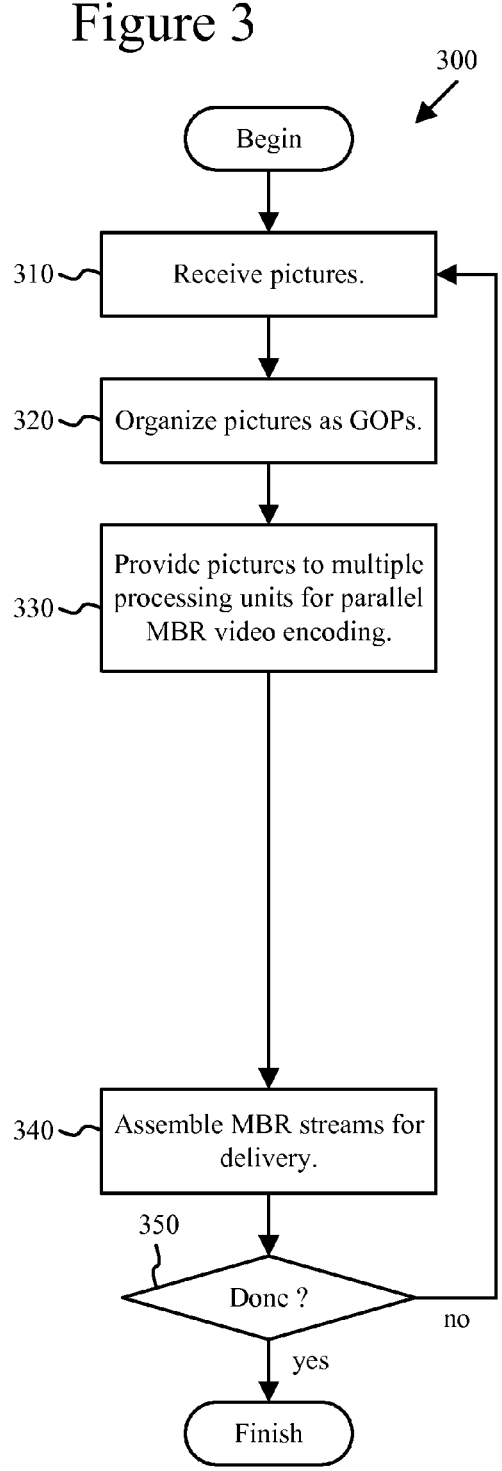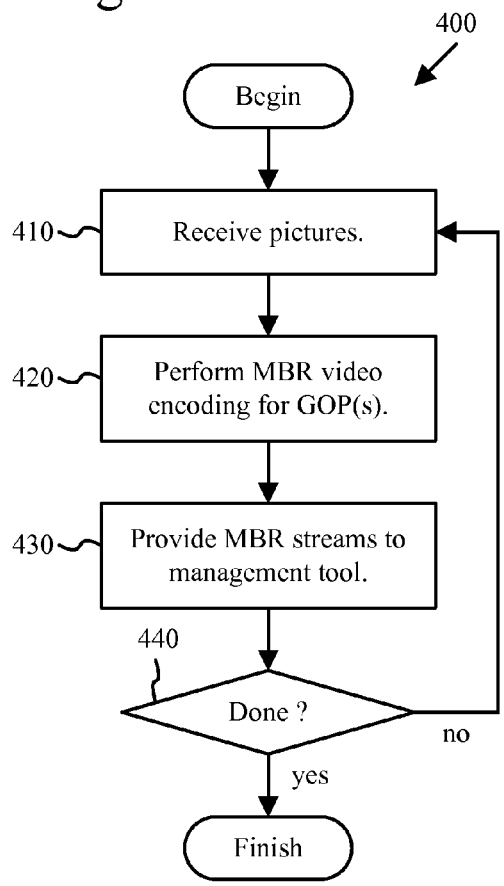

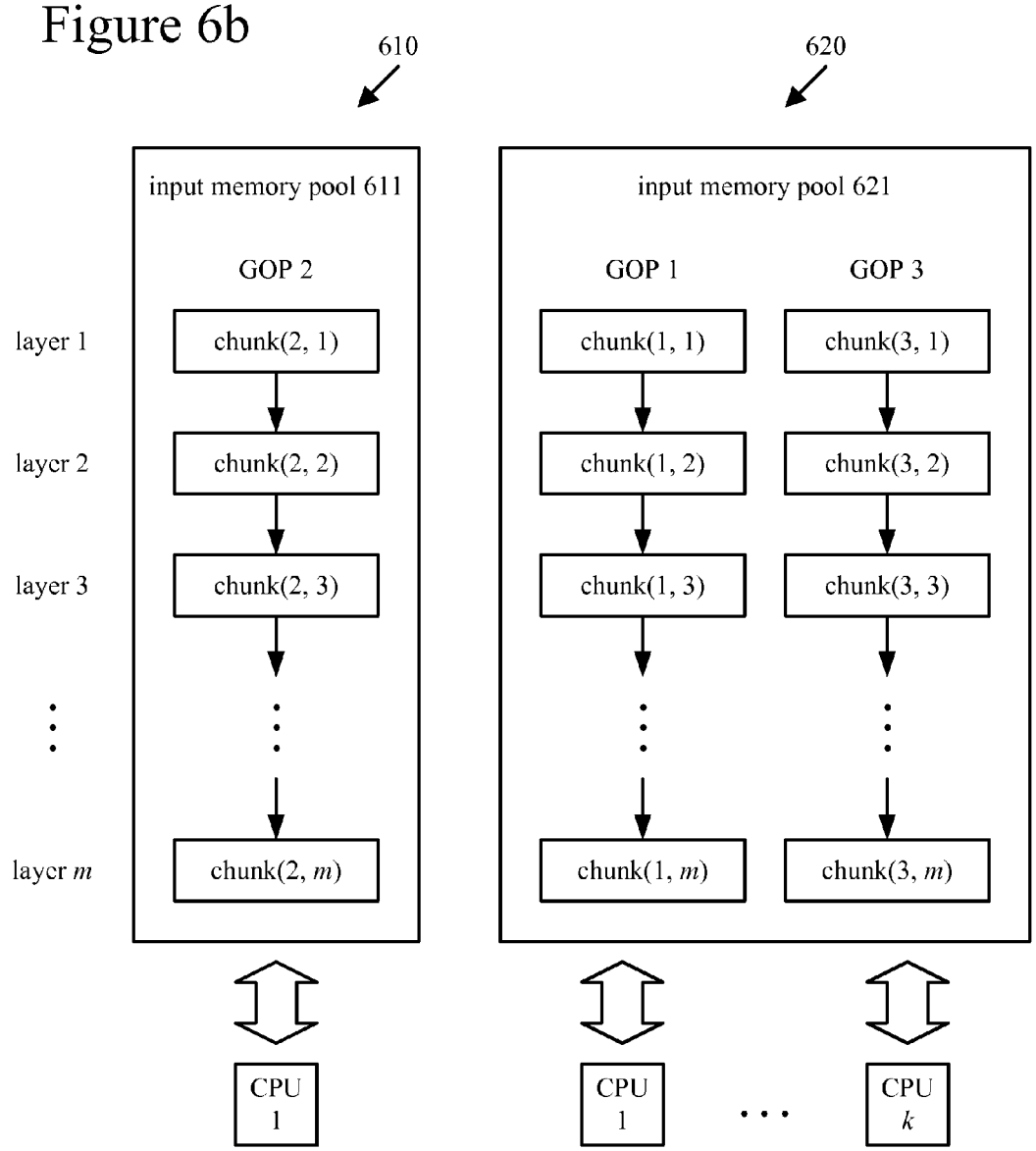

PARALLEL MULTIPLE BITRATE VIDEO ENCODING TO REDUCE LATENCY AND DEPENDENCES BETWEEN GROUPS OF PICTURES

BACKGROUND

Compression (also called coding or encoding) decreases the cost of storing and transmitting media by converting the media into a lower bitrate form. Decompression (also called decoding) reconstructs a version of the original media from the compressed form.

When it converts media to a lower bitrate form, a media encoder can decrease the quality of the compressed media to reduce bitrate. By selectively removing detail in the media, the encoder makes the media simpler and easier to compress, but the compressed media is less faithful to the original media. Aside from this basic quality/bitrate tradeoff, the bitrate of the media depends on the content (e.g., complexity) of the media and the format of the media.

Media information is organized according to different formats for different devices and applications. Many attributes of format relate to resolution. For video, for example, spatial resolution gives the width and height of a picture in samples or pixels (e.g., 320×240, 640×480, 1280×720, 1920×1080). Temporal resolution is usually expressed in terms of number of pictures per second (e.g., 30, 29.97, 25, 24 or 23.976 frames per second for progressive video, or 60, 59.94 or 50 fields per second for interlaced video). Typically, quality and bitrate vary directly for resolution, with higher resolution resulting in higher quality and higher bitrate.

Delivering media content over the Internet and other computer networks has become more popular. Generally, a media server distributes media content to one or more media clients for playback. Media delivery over the Internet and some other types of networks is characterized by bandwidth that varies over time. If the bitrate of media content is too high, the media content may be dropped by the network, causing playback by the media client to stall. The media client can buffer a large portion of the media content before playback begins, but this results in a long delay before playback starts. On the other hand, if the bitrate of the media content is much lower than the network could deliver, the quality of the media content played back will be lower than it could be. By adjusting bitrate of media content so that bitrate more closely matches available network bandwidth, a media server can improve the media client's playback experience.

Scalable media encoding facilitates delivery of media when network bandwidth varies over time or when media clients have different capabilities. Multiple bitrate (MBR) video encoding is one type of scalable video encoding. A MBR video encoder encodes a video segment to produce multiple video streams (also called layers) that have different bitrates and quality levels, where each of the streams is independently decodable. A media server (or servers) can store the multiple streams for delivery to one or more media clients. A given media client receives one of the multiple streams for playback, where the stream is selected by the media client and/or media server considering available network bandwidth and/or media client capabilities. If the network bandwidth changes during playback, the media client can switch to a lower bitrate stream or higher bitrate stream. Ideally, switching between streams is seamless and playback is not interrupted, although quality will of course change.

For example, a MBR video encoder receives a segment of high-resolution video such as video with a resolution of 1080p24 (height of 1080 pixels per progressive frame, 24 frames per second, or, in some cases, 23.976 frames per second) and encodes the high-resolution video for output as layers with 12 different bitrates. Of the 12 layers, a high bitrate layer might have the original 1080p24 resolution with little loss in quality, a next lower bitrate layer might have the original 1080p24 resolution with more loss in quality, and so on, down to a lowest bitrate layer with 640×360 spatial resolution and the most loss in quality. In MBR video encoding, adjustments to spatial resolution and the level of encoding quality for "lossy" compression are most common, but temporal resolution can also vary between the multiple layers output by the MBR video encoder.

A MBR video encoder typically produces the multiple output streams by separately encoding the input video for each stream. In addition, the MBR video encoder may perform encoding multiple times for a given output stream so that the stream has the target bitrate set for the stream. Video encoding for a single stream can be computationally intensive. Time constraints on media encoding and delivery (e.g., for live sporting events) may require that even more resources be dedicated to encoding. Because it involves encoding and re-encoding for multiple output streams, MBR video encoding can consume a significant amount of computational resources, especially for high resolutions of video. While existing ways of performing MBR video encoding provide adequate performance in many scenarios, they do not have the benefits and advantages of techniques and tools described below.

SUMMARY

In summary, the detailed description presents techniques and tools for managing multiple bitrate (MBR) video encoding. The techniques and tools help manage MBR video encoding so as to better exploit opportunities for parallel encoding with multiple processing units. Compared to previous approaches for MBR video encoding, for example, this can reduce overall encoding time by more efficiently using available computational resources.

According to one aspect of the techniques and tools described herein, a video encoding management tool receives pictures for video and organizes the pictures as multiple groups of pictures (GOPs). The video encoding management tool can set GOP boundaries that define the GOPs based upon results of scene change detection, so that a GOP does not include a scene change.

The video encoding management tool provides the pictures to multiple processing units for MBR video encoding in parallel. At least two of the multiple GOPs are made available to the processing units for encoding in parallel to each other, which more efficiently uses the processing units. To facilitate parallel encoding between GOPs, the management tool disables motion estimation dependencies between GOPs for the MBR video encoding. Each of the multiple GOPs can then be encoded independently of other GOPs.

In some configurations, the multiple processing units are on a single computing system, and the management tool transfers pictures to a memory pool of the computing system. For example, the management tool assigns a first GOP to a first set of one of more processing units, assigns a second GOP to a second set of one or more processing units, etc. The management tool provides pictures for the assigned GOPs to a memory pool accessible to the different sets of processing units at the computing system.

In other configurations, the multiple processing units are distributed among multiple different locations on a computer network, and the management tool transmits segments of pictures over the network. For example, the management tool assigns a first GOP to a first set of one of more processing units of a first computing system, assigns a second GOP to a second set of one of more processing units of a second computing system, etc. The management tool provides pictures for the assigned GOPs to memory pools accessible to the different sets of processing units at the respective computing systems.

According to another aspect of the techniques and tools described herein, a video encoding management tool determines a value that balances latency and processing unit utilization. For example, the management tool determines the value based upon user input for a user setting of the video encoding management tool and/or a default system setting of the video encoding management tool. Based at least in part on the determined value, the management tool determines a number of GOPs to encode in parallel on a computing system that includes multiple processing units. The management tool provides pictures to the processing units for parallel MBR video encoding of the determined number of GOPs.

For example, the management tool selects between (1) a first mode in which more GOPs are encoded in parallel, encoding latency increases, fewer processing units per GOP are used in MBR video encoding and processing unit utilization increases, or (2) a second mode in which fewer GOPs are encoded in parallel, encoding latency decreases, more processing units per GOP are used in the MBR video encoding and processing unit utilization decreases. In determining the number of GOPs to encode in parallel with a computing system, the management tool can also consider factors such as GOP size, video resolution, memory of the computing system and, of course, number of processing units on the computing system.

The foregoing and other objects, features, and advantages of the invention will become more apparent from the following detailed description, which proceeds with reference to the accompanying figures.

BRIEF DESCRIPTION OF THE DRAWINGS

FIG. 3 is a flow chart illustrating a generalized technique for managing MBR video encoding with a MBR video encoding management tool.

FIG. 4 is a flow chart illustrating a generalized technique for performing MBR video encoding as instructed by a MBR video encoding management tool.

FIGS. 6a-6c are diagrams of input memory pools storing GOPs for parallel MBR video encoding.

DETAILED DESCRIPTION

Figure 1:
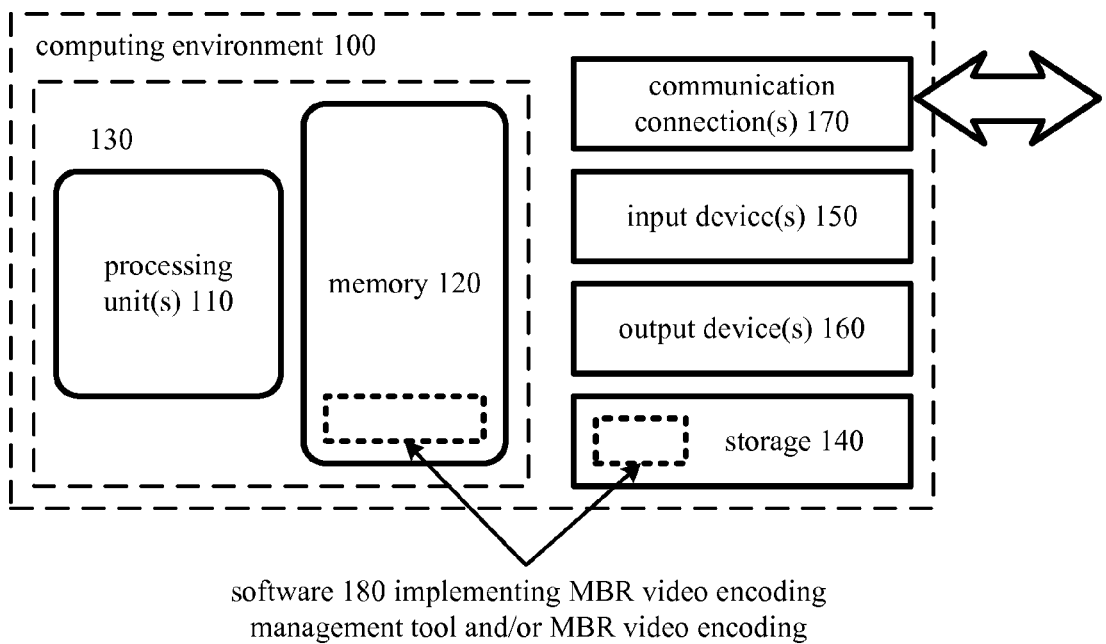
FIG. 1 is a block diagram illustrating an example computing environment in which several described techniques and tools may be implemented.

The present application relates to techniques and tools for managing MBR video encoding. The techniques and tools improve management of MBR video encoding by more efficiently exploiting opportunities for parallelism across multiple processing units.

A conventional MBR video encoder performs serial encoding of one GOP after another. The encoder encodes the multiple streams for a first GOP, then encodes the multiple streams for a second GOP, then encodes the multiple streams for a third GOP, and so on. When encoding a given GOP, the conventional MBR video encoder sequentially encodes one stream after another. When encoding a given stream, the encoder may split encoding tasks between multiple processing units, but opportunities for parallel encoding are limited by data dependencies between encoding tasks. The conventional MBR video encoder thus operates subject to: (1) data dependencies between successive GOPs (encoding for a current GOP waits until encoding of the previous GOP finishes); (2) data dependencies between successive streams within the same GOP boundary (encoding for a current stream waits until encoding of the previous stream finishes); and (3) data dependencies between encoding tasks for a stream (some encoding tasks for a current picture wait until other encoding tasks for the current picture or previous picture finish, or dependencies are caused by frame partitions and data synchronization points after partition encoding).

With the conventional MBR video encoder, due to sequential ordering constraints imposed on MBR video encoding by these data dependencies, it can be difficult to fully utilize the processing units available for MBR video encoding. Multi-threading models provide some opportunities for parallelism in MBR video encoding, but the multi-threading models often do not scale well as the number of processing units increases. For example, a conventional MBR video encoder that encodes 12 layers of output per GOP, encodes GOP-after-GOP and uses a multi-threaded encoding implementation executing on 8 processing units, encodes 720p video in 6× the amount of time real-time encoding would take. The multi-threaded encoding implementation effectively utilizes the 8 processing units for MBR video encoding, but shows only a small performance improvement when the number of CPU cores doubles to 16.

The average number of processing units in a new computing system continues to grow from year to year. In addition, cloud computing is becoming more affordable. In short, computing resources are becoming cheaper and more easily accessible. Existing approaches to parallel MBR video encoding, however, do not scale well when more computing resources are simply added to the tasks of MBR video encoding.

With techniques described herein, a MBR video encoding management tool more efficiently utilizes CPU cores that are available for MBR video encoding. For example, instead of focusing only on multi-threading for encoding tasks for a single picture or the pictures of a single GOP, the MBR video encoding management tool parallelizes the encoding of multiple GOPs between different CPU cores. The different CPU cores can be on the same computing system or on different, distributed computing systems. With this parallel MBR video encoding architecture, streams for multiple different GOPs can be encoded in parallel, instead of performing MBR video encoding on a GOP-by-GOP basis.

In some implementations, the MBR video encoding management tool provides pictures to an input memory pool of a computing system (or to different input memory pools of different computing systems in a network). An input memory pool is filled with "chunks" of pictures of a GOP for encoding as layers of the GOP. The pool has different chunks for different layers of MBR video encoding for the GOP. A single input memory pool can have chunks for one GOP or chunks for multiple GOPs. The input memory pool of a computing system is accessible to the one or more processing units that are available for MBR video encoding on the computing system. A computing system can use one or more processing units to encode the chunk for a layer, with a single-threaded implementation or multi-threaded implementation used for the encoding, and possibly with different processing units used for parallel encoding of different layers for a GOP.

To facilitate parallel encoding of GOPs, data dependencies between GOPs are removed for MBR video encoding. Compared to conventional GOP-after-GOP encoding, the chunks for one GOP can be encoded independently of and concurrently with the chunks for other GOPs, using whatever processing units and computing systems are available. A GOP can even be encoded out of order while still maintaining the proper ordering of the output MBR video streams. Without data dependencies between GOPs in MBR video encoding, utilization of processing units improves.

In some implementations, the MBR video encoding management tool can vary the number of GOPs to be encoded in parallel on a computing system. If more GOPs are encoded in parallel, then fewer processing units are used per GOP and latency from encoding is expected to increase, but processing units are less likely to be idle. On the other hand, if fewer GOPs are encoded in parallel, then more processing units are used per GOP and latency is expected to decrease, but processing units are more likely to be idle. By setting the number of GOPs to encode in parallel on a computing system, the MBR video encoding management tool can favor parallelism in encoding for different GOPs at the expense of parallelism in encoding inside a GOP, or vice versa, to get a suitable balance between latency and throughput in the parallel MBR video encoding architecture.

By providing a framework for distributed MBR video encoding of multiple GOPs in parallel, a MBR video encoding management tool can better exploit the processing power of available computing systems and processing units. Collectively, techniques and tools described herein can dramatically improve performance of MBR video encoding. For example, a MBR video encoding tool that encodes 12 layers of output per GOP, encodes multiple GOPs in parallel, and uses a multi-threaded encoding implementation executing on 8 processing units, can encode 1080p video in 6× the amount of time real-time encoding would take (compared to 720p video with the conventional MBR video encoder). Moreover, when additional computing systems or processing units are available (e.g., in a cloud computing environment), performance improvement basically scales in a linear way to reduce encoding time (compared to only small improvement with the conventional MBR video encoder when more computing resources are added). This enables real-time full HD 1080p MBR video encoding/ingestion for video services and real-time full HD MBR 1080p video uploading/transcoding for sharing video over the Internet.

Various alternatives to the implementations described herein are possible. Certain techniques described with reference to flowchart diagrams can be altered by changing the ordering of stages shown in the flowcharts, by splitting, repeating or omitting certain stages, etc. The different aspects of the MBR video encoding management can be used in combination or separately. Different embodiments implement one or more of the described techniques and tools. Some of the techniques and tools described herein address one or more of the problems noted in the background. Typically, a given technique/tool does not solve all such problems.

I. Computing Environment.

FIG. 1 illustrates a generalized example of a suitable computing environment (100) in which several of the described techniques and tools may be implemented. The computing environment (100) is not intended to suggest any limitation as to scope of use or functionality, as the techniques and tools may be implemented in diverse general-purpose or special-purpose computing environments.

With reference to FIG. 1, the computing environment (100) includes one or more processing units (110) and memory (120). In FIG. 1, this most basic configuration (130) is included within a dashed line. The processing unit (110) executes computer-executable instructions. In a multi-processing system, multiple processing units execute computer-executable instructions to increase processing power. The memory (120) may be volatile memory (e.g., registers, cache, RAM), non-volatile memory (e.g., ROM, EEPROM, flash memory, etc.), or some combination of the two. The memory (120) stores software (180) implementing MBR video encoding management and/or MBR video encoding.

A computing environment may have additional features. For example, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The tangible storage (140) may be removable or non-removable, and includes magnetic disks, magnetic tapes or cassettes, CD-ROMs, DVDs, or any other medium which can be used to store information in a non-transitory way and which can be accessed within the computing environment (100). The storage (140) stores instructions for the software (180) implementing MBR video encoding management and/or MBR video encoding.

The input device(s) (150) may be a touch input device such as a keyboard, mouse, pen, or trackball, a voice input device, a scanning device, or another device that provides input to the computing environment (100). For video encoding, the input device(s) (150) may be a video card, TV tuner card, or similar device that accepts video input in analog or digital form, or a CD-ROM or CD-RW that reads video samples into the computing environment (100). The output device(s) (160) may be a display, printer, speaker, CD-writer, or another device that provides output from the computing environment (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available tangible media that can be accessed within a computing environment. By way of example, and not limitation, with the computing environment (100), computer-readable media include memory (120), storage (140), and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine" and "perform" to describe computer operations in a computing environment. These terms are high-level abstractions for operations performed by a computer, and should not be confused with acts performed by a human being. The actual computer operations corresponding to these terms vary depending on implementation.

II. Network Environment.

Figure 2:
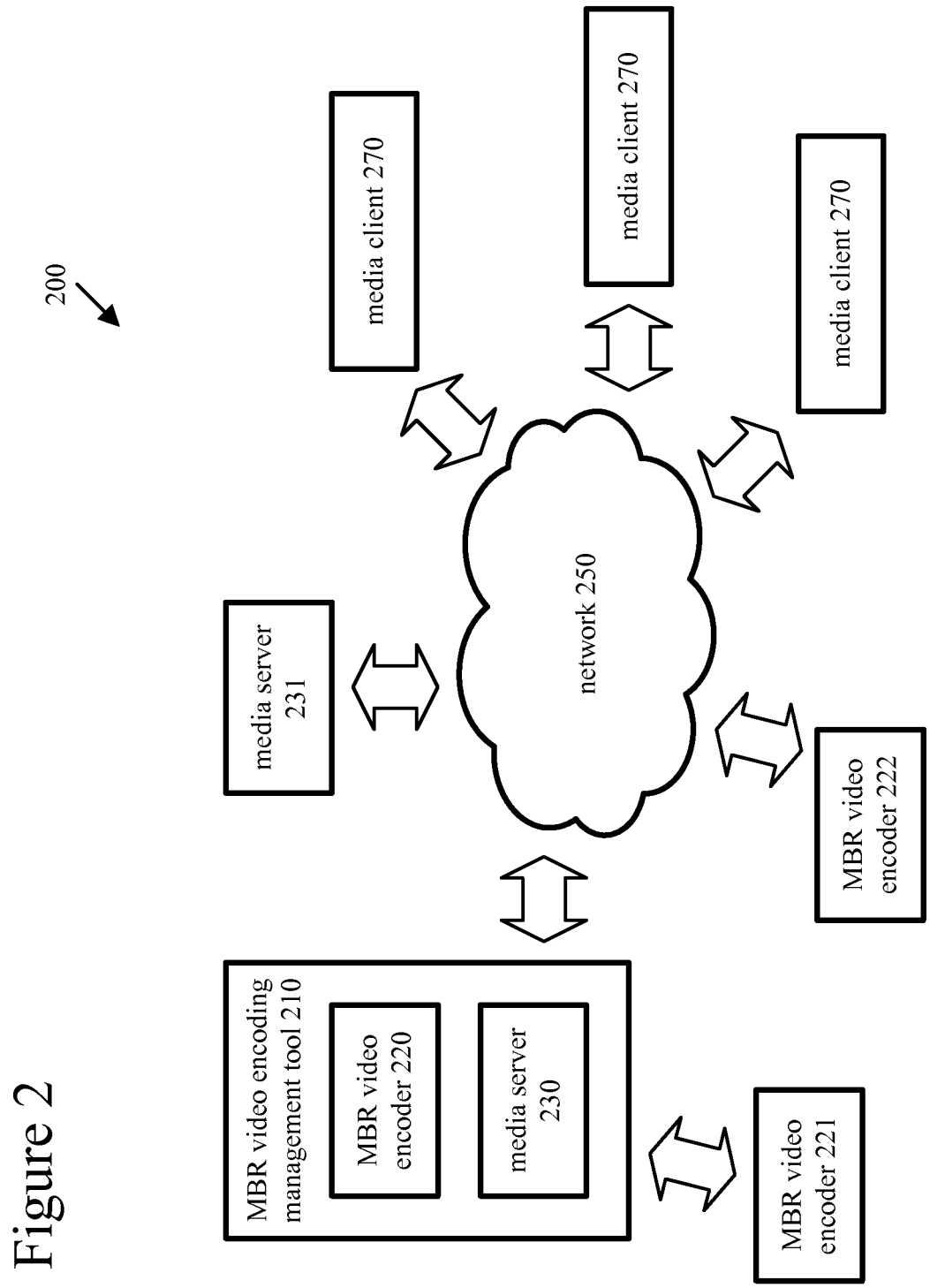
FIG. 2 is a diagram illustrating an example network environment in which several described techniques and tools may be implemented.

FIG. 2 shows an example network environment (200) including a MBR video encoding management tool (210), three MBR video encoders (220, 221, 222) and two media servers (230, 231) that distribute media content over a network (250) to multiple media clients (270). The network (250) can include the Internet or another computer network.

The MBR video encoding management tool (210) manages MBR video encoding by one or more of the MBR video encoders (220, 221, 222). For example, the tool (210) performs the technique (300) described below with reference to FIG. 3. Although FIG. 2 shows three MBR video encoders, the MBR video encoding management tool (210) can manage more or fewer encoders. The MBR video encoding management tool (210) provides incoming video source segments to one or more of the MBR video encoders (220, 221, 222). For an encoder on the same computing system, the tool (210) transfers the video over, e.g., a high-speed bus. For an encoder on a separate computing system, the tool (210) transmits the video using an appropriate communication protocol.

A MBR video encoder (220, 221, or 222) codes pictures of a GOP into multiple layers with different bitrates and quality levels. For example, the encoder performs the technique (400) described below with reference to FIG. 4. The encoder executes on a computing system with one or more processing units. The encoder can execute on the same computing system as the MBR video encoding management tool (210) or execute on a separate computing system. The separate computing system can be directly connected to the computing system with the MBR video encoding management tool (210) or connected over a network cloud (250).

In some implementations, each computing system with a MBR video encoder (220, 221 or 222) maintains an input buffer memory pool. When the buffer is filled for a GOP, the encoder (220, 221 or 222) can start encoding for an output stream for the GOP. When a buffer is filled for multiple GOPs, or when buffers of different computing systems are filled for multiple GOPs, the multiple GOPs can be encoded in parallel, with improved utilization of processing units.

In some respects, the MBR video encoding management tool (210) is codec independent, in that the tool (210) can work with any available video encoder that accepts pictures as provided by the tool (210) and provides suitable output streams. For example, a given MBR video encoder (220, 221 or 222) can produce output compliant with the SMPTE 421M standard (also known as VC-1 standard), ISO-IEC 14496-10 standard (also known as H.264 or AVC), another standard, or a proprietary format.

In other respects, the MBR video encoding management tool (210) is codec dependent, in that decisions made by the MBR video encoding management tool (210) can depend on the encoding implementation used. Different encoding implementations may have different options or effective ranges for the number of processing units used in encoding (e.g., 1 CPU, 2 CPUs, 4 CPUs), which can affect how the tool (210) assigns GOPs. Moreover, different encoding implementations (for different standards or formats, or even for the same standard or format) can have different loads for processing units, with some encoding implementation taxing processing units more than others.

The processing units that perform MBR video encoding can be general-purpose processors that execute encoding software. Or, the processing units that perform MBR video encoding can be specially adapted for video encoding according to a specific standard or format. For example, the processing units of a computing system with one of the MBR video encoders (220, 221, 222) can include or use special-purpose hardware for motion estimation, frequency transforms or other encoding operations for encoding compliant with the SMPTE 421M standard or ISO-IEC 14496-10 standard. The type of processing units on a computing system, along with the encoding implementation, affects processing load and can be considered by the tool (210) in assigning GOPs for MBR video encoding.

A MBR video encoder provides the multiple streams of MBR video to the MBR video encoding management tool (210) or a media server (230, 231). The MBR video encoding management tool (210) (or media server (230, 231)) stitches the provided MBR output streams together to produce multiple-stream MBR video for delivery to the media clients (270). If the tool (210) assembles the MBR video from the multiple streams, the tool (210) provides some or all of the MBR video to one or both of the media servers (230, 231).

A media server (230 or 231) stores MBR video for delivery to the media clients (270). The media server can store the complete MBR video or a subset of the streams of the MBR video. The media server can be part of the same computing system as the MBR video encoding management tool (210) or part of a separate computing system, which can be directly connected to the computing system with the MBR video encoding management tool (210) or connected over a network cloud (250). The media server (230 or 231) includes server-side controller logic for managing connections with one or more media clients (270).

A media client (270) includes a video decoder as well as client-side controller logic. The media client (270) communicates with a media server (220) to determine a stream of MBR video for the media client (270) to receive. The media client (270) receives the stream, buffers the received encoded data for an appropriate period, and begins decoding and playback.

The media client (270) and/or media server (220) monitor playback conditions and/or network conditions. For example, the media client (270) monitors buffer fullness for an encoded data buffer. Through communication with one of the media servers (230, 231), the media client (270) can switch between the multiple streams of MBR video at the granularity possible for the MBR video (e.g., at GOP boundaries). For example, the media client (270) switches to a lower bitrate stream if network bandwidth drops or decoding resources temporarily decrease. Or, the media client (270) switches to a higher bitrate stream if network bandwidth increases. Ideally, when the decoding switches layers at a GOP boundary, playback is not interrupted and the change in quality is not especially noticeable.

III. Generalized Techniques for Parallel MBR Video Encoding and Management

FIG. 3 shows a generalized technique (300) for managing parallel MBR video encoding. A tool such as the MBR video encoding management tool (210) of FIG. 2 or other management tool performs the technique (300). FIG. 4 shows a generalized technique (400) for performing MBR video encoding, as managed by a management tool. An encoder such as a MBR video encoder (220, 221, or 222) of FIG. 2 or other encoder performs the technique (400).

To start, the management tool receives (310) pictures for a video sequence. For example, the tool receives the pictures from a video card, camera, local storage, network connection or other video source. The tool can perform pre-processing on the pictures to change spatial resolution, change temporal resolution, or perform other filtering before providing the pictures for MBR video encoding.

The management tool organizes (320) the received pictures as multiple GOPs, where each of the multiple GOPs includes one or more of the received pictures. Generally, the received pictures are split into a series of non-overlapping GOPs. The tool organizes (320) the received pictures as GOPs by splitting the pictures into different segments defined by GOP boundaries. To set the GOP boundaries, the tool can consider factors such as default GOP size, scene changes, and expected motion estimation efficiencies. The tool can annotate pictures with GOP information or otherwise introduce information that indicates GOP boundaries, or the tool can simply split pictures into different segments that are provided to one or more MBR video encoders.

Conventionally, a GOP starts with a picture that will be encoded with intra-picture encoding, and that initial picture is followed by one or more pictures that will be encoded with inter-picture encoding. With some encoders, however, a GOP can begin with a frame that mixes intra and inter-picture compression for different fields, and a GOP can also include one or more other intra-coded pictures after the initial picture.

The pattern of picture types in a GOP (e.g., display order of IBBPBBP..., IBPBPBP..., etc.) is typically set by a MBR video encoder. To facilitate MBR video encoding of different GOPs in parallel, however, the management tool disables data dependencies between GOPs. In particular, the management tool disables motion estimation/compensation dependencies between GOPs so that pictures in one GOP do not use reconstructed pictures from another GOP for motion estimation/compensation. This allows encoding for a GOP that is independent of the encoding of other GOPs. Disabling dependencies between GOPs also facilitates smooth playback when a decoder switches between different layers of MBR video at GOP boundaries. After a decoder switches to a new stream, the decoder can begin decoding from the new GOP without reliance on reference pictures from earlier in the sequence.

Figure 5:
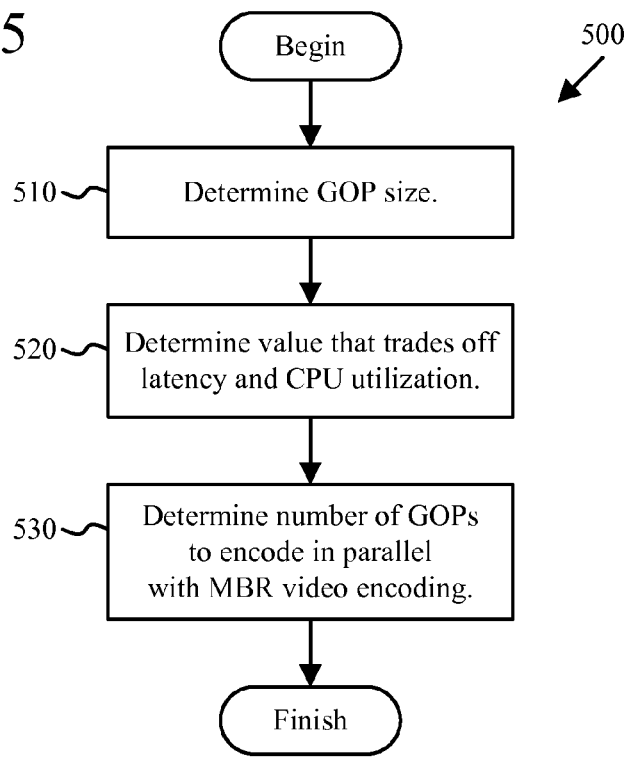
FIG. 5 is a flow chart illustrating a generalized technique for determining a number of GOPs to encode in parallel with MBR video encoding.

When splitting pictures into GOPs, the tool can adjust the number of pictures per GOP to trade off compression efficiency and flexibility in switching streams, as described below with reference to FIG. 5. Using smaller GOPs facilitates finer-grained stream switching in decoding and finer-grained GOP assignment in parallel encoding, but hurts compression performance. Even if the tool has a default number of pictures per GOP, the tool can change the number of pictures in selected GOPs to improve the expected performance of motion estimation. For example, in some implementations, to determine where to set the boundaries that define GOPs, the management tool performs scene change detection in the received pictures. The tool can use any of various known techniques for scene change detection. When the tool detects a scene change, the tool sets a GOP boundary at the scene change. A scene change provides a natural point to split pictures—the effectiveness of motion estimation within a GOP is disrupted by a scene change, and motion estimation across a scene change is unlikely to provide much benefit. Using the results of scene change detection, and using a GOP size determined by the tool, the tool sets GOP boundaries for the pictures to define the GOPs.

Returning to FIG. 3, the management tool provides (330) pictures to multiple processing units for parallel MBR video encoding. The tool assigns GOPs to one or more computing systems and/or processing units (on the same computing system or different computing systems), then transmits, transfers or otherwise conveys the pictures to make them available to the processing units for MBR video encoding.

The management tool can control how many GOPs are encoded in parallel by how it provides GOPs to different computing systems and different sets of processing units. For example, the management tool determines a number of GOPs to encode in parallel for a given computing system, or for each of multiple computing systems, using the technique (500) described with reference to FIG. 5, then provides the GOPs to different computing systems or different sets of processing units for MBR video encoding of the different GOPs in parallel.

In configurations in which a single computing system performs the MBR video encoding with multiple processing units, the tool assigns different GOPs to different sets of processing units of the computing system. The tool assigns a first GOP to a first set of one or more processing units, assigns a second GOP to a second set of one or more processing units, and so on. The tool transfers pictures for the GOPs to an input memory pool that is accessible to the different sets of processing units. The management tool itself can be part of the same computing system, or the computing system that performs MBR video encoding can be separate from the management tool.

For example, suppose a computing system has eight processing units for MBR video encoding. The management tool fills the input memory pool with a segment of pictures for one GOP, and four processing units start MBR video encoding of the GOP (pipelining encoding of different layers for the GOP). The management tool also fills the input memory pool with a segment of pictures for another GOP, and the remaining four processing units start MBR video encoding of the other GOP (again, pipelining encoding of the different layers for the GOP). When encoding finishes for a GOP, the encoder removes it from the pool and fills the pool with another GOP, which is encoded with four processing units.

Or, for the same computing system with eight processing units, the management tool fills the input memory pool with segments of pictures for four GOPs, and two processing units per GOP start MBR video encoding as soon as the GOP is in the memory pool. Compared to the preceding example, latency is increased (four GOPs encoded in parallel, each with two processing units) but the processing units are less likely to be idle during encoding.

In configurations in which distributed computing systems perform MBR video encoding, the processing units that perform the MBR video encoding are distributed among different locations on a computer network. The tool assigns different GOPs to different computing system and/or different processing units on those computing systems for MBR video encoding. The tool assigns a first GOP to a first set of one or more processing units of a first computing system for MBR video encoding, assigns a second GOP to a second set of processing units of a second computing system for MBR video encoding, and so on. The tool then transmits segments of pictures for the respective GOPs over the network to the assigned computing systems or processing units. In this way, the tool distributes the first GOP to a first input memory pool accessible to the first set of processing units, distributes the second GOP to a second input memory pool accessible to the second set of processing units, and so on. Multiple GOPs can be assigned and provided to a given computing system that has multiple processing units.

For example, suppose a first computing system has two processing units, a second computing system has one processing unit, and a third computing system has four processing units. The management tool transmits pictures for one GOP to the first computing system for MBR video encoding with its two processing units, transmits pictures for one GOP to the second computing system for MBR video encoding, and transmits pictures for two GOPs to the third computing system for MBR video encoding with two processing units per GOP.

In some implementations, one computing system includes the management tool and one or more processing units for MBR video encoding, and one or more other computing systems each include other processing unit(s) for MBR video encoding. The management tool assigns different GOPS to different processing units and/or computing system, and provides pictures for the GOPs using the appropriate mechanism.

FIG. 4 shows operations performed with one MBR video encoder. For parallel encoding, different MBR video encoders on different computing systems can perform the operations shown in FIG. 4 in parallel. On a single computing system, different sets of processing units can use different instances of a MBR video encoder, or multiple processing units can use the same MBR video encoder.

As shown in FIG. 4, a MBR video encoder receives (410) pictures for one or more GOPs and performs (420) MBR video encoding for the pictures in the GOP(s). The MBR video encoder encodes pictures of a GOP as multiple streams with different rates. When encoding pictures of a GOP for one MBR layer, the MBR video encoder uses one or more processing units assigned for encoding of the GOP. The MBR video encoder can be a single-threaded encoder implementation or multi-threaded encoder implementation, and the encoder can use or include special-purpose hardware for video encoding.

The encoder varies the level of encoding quality between different layers of MBR video for a GOP in order to provide different bitrates. The encoder can also vary spatial resolution between layers. In addition, although the layers of MBR video for a GOP are typically aligned at GOP boundaries, the encoder can vary temporal resolution within a GOP to adjust bitrate.

In some implementations, the MBR video encoder sequentially encodes different layers for a GOP according to layer-to-layer dependencies. For example, the encoder starts with the highest bitrate layer, continues by encoding the next highest layer after finishing encoding for the highest bitrate layer, etc. and ends with encoding of the lowest bitrate layer. The encoder uses results of encoding from one layer to simplify the encoding process for subsequent layers. For example, the encoder uses motion vectors from one layer to guide motion estimation during encoding for a subsequent layer. By starting motion estimation at the motion vectors used for the other layer, the encoder is more likely to quickly find suitable motion vectors for the layer currently being encoded. Or, the encoder simply reuses motion vectors from one level for another level. Aside from motion vectors, the encoder can also consider macroblock type information, intra/inter block information, and other information that reflects encoder decisions.

The MBR video encoder provides (430) streams of MBR video for the GOP(s) to the management tool. Alternatively, the encoder provides the streams to a media server for stitching the streams together. The encoder checks (440) whether encoding has finished and, if not, continues by receiving (410) pictures for one or more other GOPs.

Returning to FIG. 3, the MBR video encoding management tool assembles (340) MBR streams from the MBR video encoder(s). The tool assembles the streams into MBR video for switching during delivery to one or more video decoders. Alternatively, a media server performs the assembling (340).

The management tool checks (350) whether encoding has finished and, if not, continues by receiving (310) more pictures to be encoded. Although FIGS. 3 and 4 shown operations of the management tool and encoder sequentially, for different pictures in a sequence the management tool can perform operations shown in FIG. 3 concurrently with other operations shown in FIG. 3 and concurrently with encoder operations shown in FIG. 4. For example, while multiple MBR video encoders encode pictures for one batch of GOPs, the management tool receives new pictures and organizes the new pictures as GOPs to be provided to the encoders for the next batch of GOPs. And, while the MBR video encoders encode for the next batch of GOPs, the management tool assembles layers for the previous batch for delivery as MBR video.

IV. Generalized Techniques for Determining a Number of GOPS to Encode in Parallel FIG. 5 shows a generalized technique (500) for determining a number of GOPs to encode in parallel on a given computing system with MBR video encoding. A tool such as the MBR video encoding management tool (210) of FIG. 2 or other management tool performs the technique (500).

The management tool first determines (510) a GOP size. In some implementations, the tool determines a default GOP size according to a management tool setting or user setting for a value that trades off compression efficiency and GOP granularity. Having long GOPs usually improves compression efficiency by providing more opportunities for inter-picture coding. Having long GOPs can make it harder for the tool to distribute GOPs to different processing units for encoding, however, since fewer GOPs are available to work with. Moreover, having long GOPs makes stream switching less fine-grained. Conversely, having shorter GOPs can hurt compression efficiency because more pictures are intra-picture coded. But using short GOPs can make it easier for the tool to parallelize encoding of different GOPs, since the tool has more GOPs to choose from, and it facilitates fine-grained stream switching and faster recovery from data loss.

Before deciding how many GOPs to encode in parallel with MBR video encoding on a given computing system, the management tool also determines (520) a value that trades off latency and processing unit utilization. Processing unit utilization corresponds to throughput, in that throughput increases when processing units approach saturation and throughput decreases when processing units are idle. When deciding how to balance encoder latency and throughput, the management tool can establish of preference for faster per GOP encoding (shorter latency) of fewer GOPs in parallel, with more processing units used per GOP but a greater chance that processing units will be idle due to dependencies between encoding tasks (worse processing unit utilization/throughput). Or, the management tool can establish a preference for slower per GOP encoding (longer latency) of more GOPs in parallel, with fewer processing units used per GOP but a higher chance that processing units will be saturated (better processing unit utilization/throughput). Encoding more GOPs in parallel also requires more memory to store pictures.

In some implementations, the tool sets the value that trades off latency and processing unit utilization according to a default setting of the management tool or according to a user setting. For example, for live streaming scenarios, the user can set the management tool to favor short latency over throughput, so that the management tool assigns fewer GOPs to be encoded in parallel with more processing units used per GOP. Or, for off-line encoding scenarios, the user can set the management tool to favor throughput over short latency, so that the management tool assigns more GOPs to be encoded in parallel with fewer processing units used per GOP.

The management tool then determines (530) a number of GOPs to encode in parallel with MBR video encoding on a given computing system. That number of GOPs is assigned to different sets of processing units on the computing system for parallel encoding. The management tool can use the same number of GOPs for each of multiple computing systems, or the management tool can use different numbers of GOPs for different computing systems. When determining the number of GOPs to encode in parallel for a given computing system, the management tool can consider: (1) GOP size, (2) the number of processing units on the computing system (e.g., 1, 2, 4 or 8 processing units), (3) memory available for pictures on the computing system, (4) the video encoder implementation that will be used (e.g., single-threaded, multi-threaded and effective with up to two processing units, multi-threaded and effective with up to four processing units), (5) the types of processing units (e.g., general-purpose, hardware accelerated, special-purpose) and corresponding encoding speed, and/or (6) expected complexity of encoding (e.g., considering number of layers of MBR video, resolutions, bitrates).

For example, for a computing system with eight processing units, the management tool sets the number of GOPs to encode in parallel to two, in which case four processing units per GOP will used for encoding. Or, the management tool sets the number of GOPs to encode in parallel to four, in which case two processing units per GOP will used for encoding. Table 1 shows options for number of GOPs to encode in parallel, as well as tradeoffs in terms of latency, throughput and memory utilization for a computing system that performs MBR video encoding into 12 MBR layers with 8 processing units.

TABLE 1

Varying Number of GOPs to Encode in Parallel.

| # GOPs in Parallel | CPUs per GOP | Chunks in Memory Pool | Encoding Latency Per GOP | CPU Utilization |
|---|---|---|---|---|
| 1 | 8 | 12 (least memory used) | fastest encoding | least saturated |
| 2 | 4 | 24 | faster encoding | less saturated |
| 4 | 2 | 48 | slower encoding | more saturated |
| 8 | 1 | 96 (most memory used) | slowest encoding | most saturated |

GOP size can affect the number of GOPs to encode in parallel. With long GOPs, available memory may limit how many GOPs can be encoded in parallel on a computing system. Similarly, the number of MBR layers to be encoded per GOP affects memory utilization and can limit the number of GOPs to encode in parallel.

The management tool can vary GOP size to trade off processing unit utilization and compression efficiency. As explained above, GOP size also affects granularity of stream switching and granularity of GOP assignment by the management tool. Table 2 shows options for GOP size when encoding a series of 32 pictures, as well as tradeoffs in terms of compression efficiency and throughput for a computing system that performs MBR video encoding with 8 processing units.

TABLE 2

Varying GOP Size.

| GOP Size | # GOPs in Parallel | CPUs per GOP | Compression Efficiency | CPU Utilization |
|---|---|---|---|---|
| 32 | 1 | 8 | most efficient | least saturated |
| 16 | 2 | 4 | more efficient | less saturated |
| 8 | 4 | 2 | less efficient | more saturated |
| 4 | 8 | 1 | least efficient | most saturated |

V. Example Assignments of GOPs for Parallel MBR Video Encoding

Figure 6A:
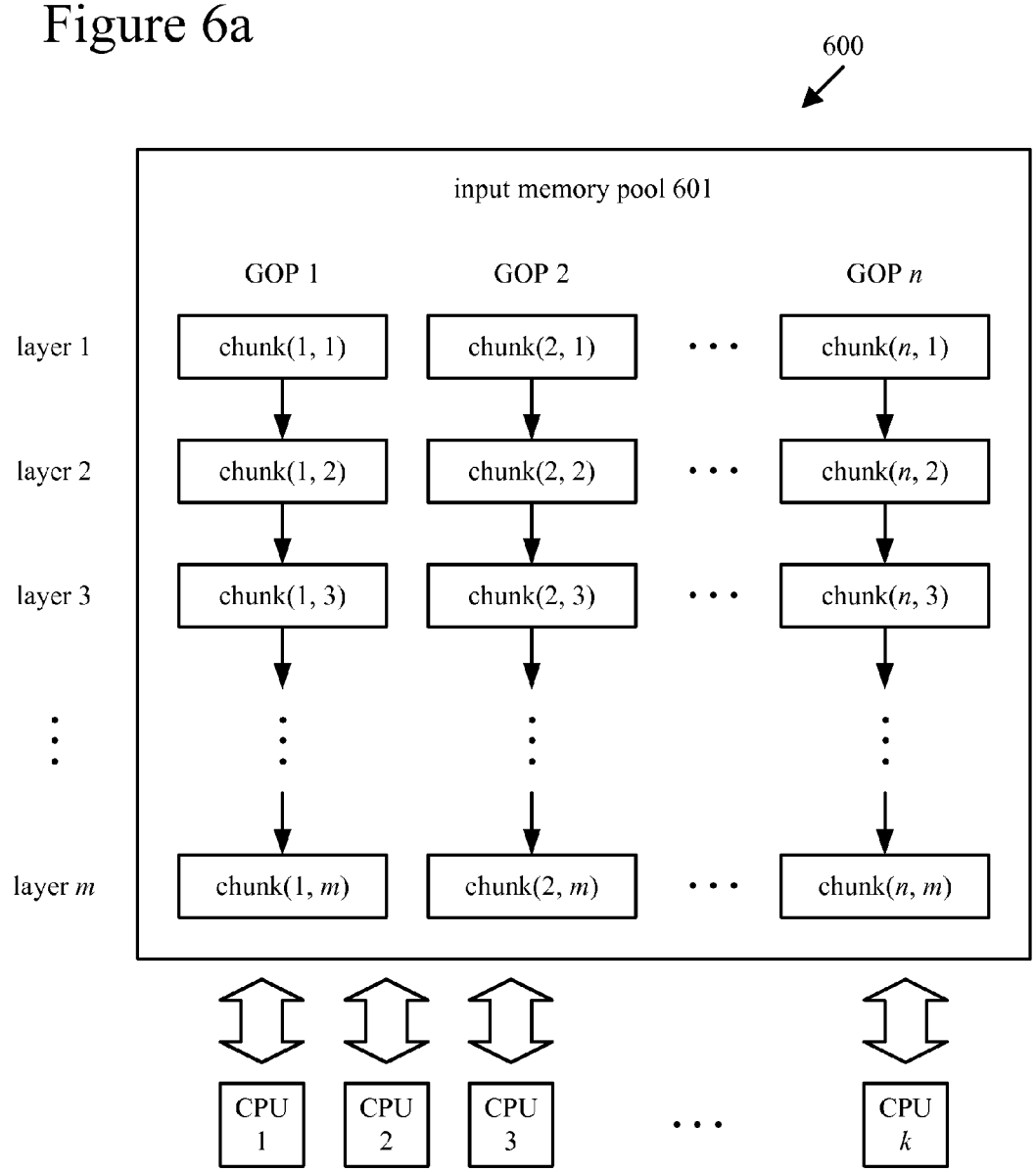
Figure 6C:
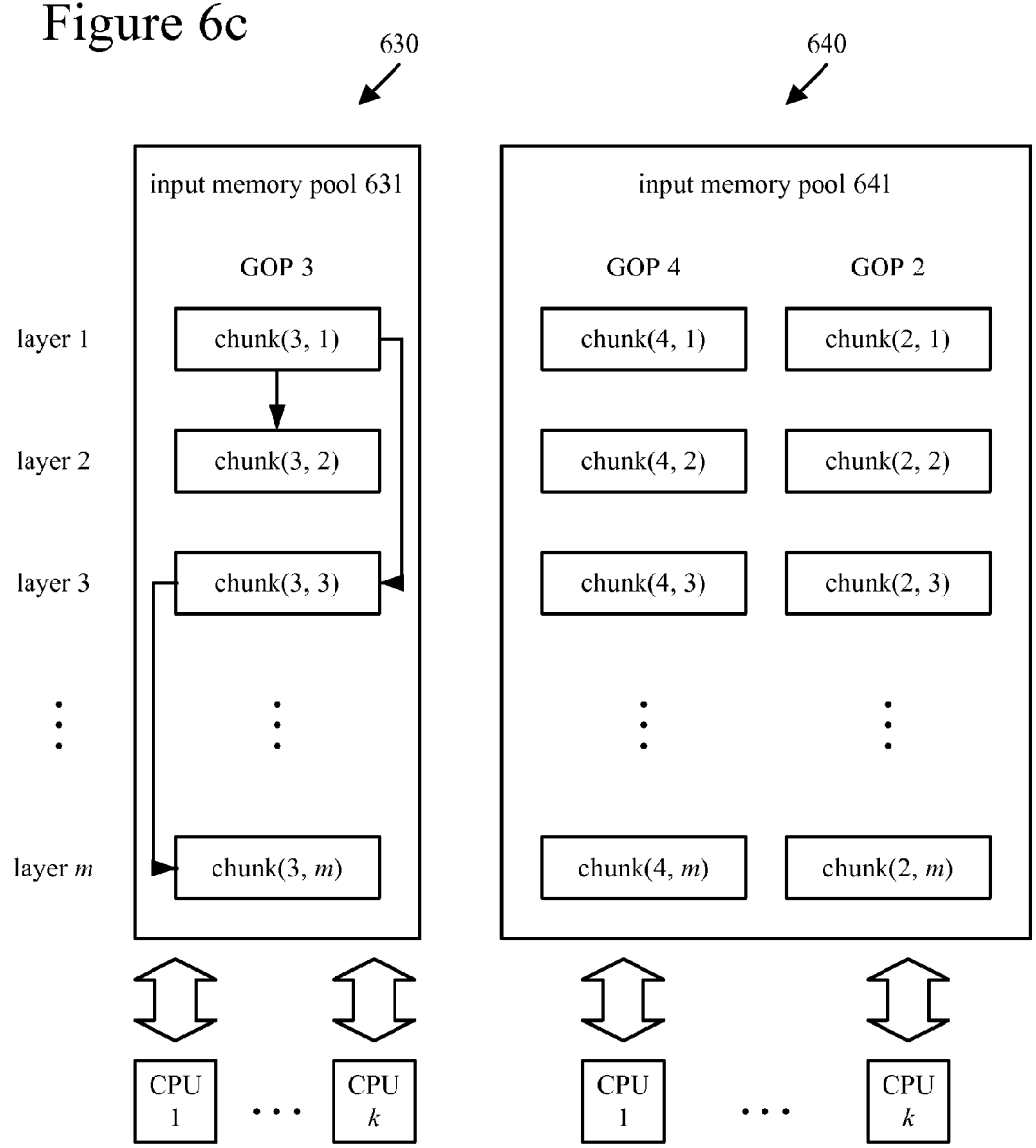

FIGS. 6a-6c show input memory pools for example assignments of GOPs to different sets of processing units and/or different computing systems. Generally, a MBR video encoding management tool can distribute video to one or more computing systems, each having one or more processing units. The way the management tool distributes video can be I/O bound and memory bound, depending on resources of the environment. In some instances, network connection speeds and bandwidth limit how the management tool provides video to separate computing systems for MBR video encoding. For any given computing system, available memory limits how many GOPs and layers can be encoded in parallel.

In FIG. 6a, the input memory pool (601) of a computing system (600) stores pictures for n GOPs, where n is, for example, a number between one and five. The memory pool (601) stores a chunk for each of m layers for MBR video encoding, where m is, for example, a number between 2 and 32. The values for n and m depend on implementation. In example implementations, n is 3 and m is 15. Ultimately, memory is a bottleneck for the number of GOPs and layers for which pictures are stored in the memory pool (601).

The computing system (600) has k processing units (shown as CPUs), which can be general-purpose processing units or special-purpose processing units for video encoding. For example, k is 2, 4, or 8. According to FIG. 6a, MBR video encoding is performed on a layer-by-layer basis (with layers for up to n GOPs being encoded in parallel by k/n processing units per GOP layer), and layers for different GOPs can be encoded independently—there are no dependencies between GOPs. FIG. 6a shows layer-to-layer dependencies, however, for each of the n GOPs. For a GOP, chunks are encoded sequentially from layer to layer, using the processing units that are available. The chunk for layer 1 is encoded first, then the chunk for layer 2, and so on, until the chunk for layer m is encoded.

Layer-after-layer encoding for a GOP permits reuse of encoding parameters. The parameters can be encoder settings or decisions that are not signaled in a bitstream, or the parameters can be syntax elements signaled in an output bitstream (e.g., for motion vectors, picture types or slice types, macroblock modes, intra/inter blocks). In particular, the encoder uses motion vectors for macroblocks, blocks, etc. of a layer as the motion vectors to evaluate first in motion estimation for a subsequent layer. In many cases, this helps the encoder more quickly select motion vectors for the subsequent layer. Or, as another example, the encoder reuses evaluations about which macroblocks or regions of a picture are more perceptually important. Or, the encoder can reuse parameters for intensity compensation of reference pictures or other global changes to pictures during encoding.

FIG. 6b shows an input memory pool (611) of a first computing system (610) and input memory pool (621) of a second computing system (620). Unlike FIG. 6a, GOPs are distributed between multiple computing systems for parallel MBR video encoding.

The first computing system (610) has a single processing unit. The memory pool (611) of the first computing system (610) stores chunks for m layers of one GOP. The second computing system (620) has k processing units. The memory pool (621) of the second computing system (620) stores chunks for m layers of each of two GOPs (GOP 1 and GOP 3). As shown in FIG. 6b, an input memory pool need not store GOPs that are contiguous in a video sequence. By default, the second computing system (620) uses k/2 processing units per GOP for MBR video encoding.

As in FIG. 6a, MBR video encoding follows layer-to-layer dependencies for the chunks of a GOP in FIG. 6b. That constraint is relaxed for the MBR video encoding of chunks shown in FIG. 6c. When chunks for different layers of the same GOP are encoded in parallel, advantages from reusing encoding parameters can be lost since encoding decisions are remade, but utilization of processing units typically improves. The net effect depends on implementation. To the extent the encoder remakes encoding decisions (instead of reusing decisions), overall encoding time may increase, but more efficient utilization of processing units can offset the increase in encoding time. For example, a computing system can decide whether the more efficient use of two available processing units is: (a) to encode a new layer from scratch and make new encoding decisions, or (b) to help the encoding of a current layer, which reuses encoding information from a previous layer but does not fully utilize the two processing units.

FIG. 6c shows an input memory pool (631) of a first computing system (630) and input memory pool (641) of a second computing system (640). Again, GOPs are distributed between multiple computing systems for parallel MBR video encoding. The first computing system (630) and second computing system (640) each have k processing units, where k can be the same or different for the two computing systems, and each of the computing systems can perform parallel MBR video encoding.

At the first computing system (630) of FIG. 6c, for MBR video encoding of GOP 3, the first computing system (630) follows some constraints on encoding between layers, but sequential layer-after-layer encoding is not required. First, the chunk for layer 1 for GOP 3 is encoded with k processing units, since no other layer is available for encoding. After layer 1 is encoded, the chunks for layers 2 and 3 can be encoded in parallel, with k/2 processing units used for each. When encoding chunks for layers 2 and 3, encoding information from layer 1 is reused. Later layers may also have dependencies on layer 1, 2 or 3.

At the second computing system (640) of FIG. 6c, there are no data dependencies between layers or between GOPs. For MBR video encoding of GOPs 4 and 2, chunks are encoded independently from layer-to-layer and GOP-to-GOP by one or multiple available processing units.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method of managing multiple bitrate (MBR) video encoding, the method comprising, with a video encoding management tool:
    receiving pictures for video;
    organizing the received pictures as multiple groups of pictures (GOPs), each group of pictures (GOP) of the multiple GOPs including one or more of the received pictures, wherein the received pictures are split into non-overlapping GOPs having GOP boundaries, the GOP boundaries being set based on scene changes and/or expected motion estimation efficiencies;
    determining sizes of the GOPs;
    providing the received pictures to multiple processing units for MBR video encoding in parallel, wherein the number of GOPs to encode in parallel depends at least in part on the determined GOP size, and wherein, for each GOP of the multiple GOPs, the MBR video encoding includes encoding the GOP as multiple streams with different rates, and wherein at least two of the multiple GOPs are made available to the multiple processing units for encoding in parallel to each other; and
    adjusting multiple settings of the video encoding management tool to trade off latency, processing unit utilization, compression efficiency or switching granularity, wherein the multiple settings include GOP size and number of GOPs to encode in parallel.

2. The method of claim 1 further comprising, with the video encoding management tool:
    detecting one or more scene changes in the received pictures; and
    based at least in part on results of the scene change detection, setting one or more GOP boundaries for the received pictures, wherein the one or more GOP boundaries define the multiple GOPs.

3. The method of claim 1 wherein the multiple processing units are distributed among multiple different locations on a computer network, and wherein the providing the received pictures includes transmitting segments of at least some of the received pictures over the computer network.

4. The method of claim 1 further comprising, with the video encoding management tool:
    determining a value that balances latency and processing unit utilization;
    based at least in part on the determined value, determining a number of GOPs to encode in parallel on a computing system that includes two or more of the multiple processing units.

5. The method of claim 1 further comprising, with the video encoding management tool:
    determining a value that balances compression efficiency and switching granularity; and
    determining a GOP size based at least in part on the determined value;
    wherein the received pictures are organized into the multiple GOPs based at least in part of the determined GOP size.

6. The method of claim 1 further comprising, with the video encoding management tool:
    disabling motion estimation dependencies between the multiple GOPs for the MBR video encoding such that each of the multiple GOPs can be encoded independently of other GOPs.

7. The method of claim 1 further comprising, with the video encoding management tool:
assigning a first GOP of the multiple GOPs to a first set of one of more of the multiple processing units for encoding; and
assigning a second GOP of the multiple GOPs to a second set of one or more of the multiple processing units for encoding, wherein a computing system at a single location includes the first set of one or more processing units and the second set of one or more processing units, and wherein the first GOP and the second GOP are provided to an input memory pool of the computing system, the input memory pool being accessible to the first set of one or more processing units and accessible to the second set of one or more processing units.

8. The method of claim 7 wherein the computing system also includes the video encoding management tool, the method further comprising assembling the multiple streams for the multiple GOPs for switching during delivery to one or more video decoders.

9. The method of claim 1 further comprising, with the video encoding management tool:
assigning a first GOP of the multiple GOPs to a first set of one of more of the multiple processing units for encoding, wherein the first GOP is provided to a first input memory pool of a first computing system, the first input memory pool being accessible to the first set of one or more processing units; and
assigning a second GOP of the multiple GOPs to a second set of one or more of the multiple processing units for encoding, wherein the second GOP is provided to a second input memory pool of a second computing system different than the first computing system, the second input memory pool being accessible to the second set of one or more processing units.

10. The method of claim 1 wherein, for different pictures in a video sequence, the video encoding management tool concurrently performs the receiving, the organizing, the providing and/or the assembling while the multiple processing units perform the MBR video encoding.

11. A method of managing multiple bitrate (MBR) video encoding of multiple groups of pictures (GOPs), the method comprising, with a video encoding management tool:
determining a value that balances latency and processing unit utilization;
based at least in part on the determined value, determining a number of GOPs to encode in parallel on a computing system that includes multiple processing units, wherein the GOPs are non-overlapping GOPs having GOP boundaries, the GOP boundaries being set based on scene changes and expected motion estimation efficiencies;
determining a GOP size based at least in part on a value that balances compression efficiency and switching granularity, wherein the number of GOPs to encode in parallel also depends at least in part on the determined GOP size;
adjusting one or more settings of the video encoding management tool to trade off latency, processing unit utilization, compression efficiency or switching granularity, wherein the settings include GOP size and number of GOPs to encode in parallel; and
providing pictures to the multiple processing units for MBR video encoding in parallel of the determined number of GOPs, wherein, for each GOP of the multiple GOPs, the MBR video encoding includes encoding the GOP as multiple streams with different rates.

12. The method of claim 11 wherein the determining the number of GOPs to encode in parallel on the computing system comprises selecting between plural modes that include:
a first mode in which more of the multiple GOPs are encoded in parallel, encoding latency increases, fewer processing units per GOP are used in the MBR video encoding, and processing unit utilization increases; and
a second mode in which fewer of the multiple GOPs are encoded in parallel, encoding latency decreases, more processing units per GOP are used in the MBR video encoding, and processing unit utilization decreases.

13. The method of claim 11 wherein the value is determined based at least in part upon one or more of:
user input for a user setting of the video encoding management tool; and
a default system setting of the video encoding management tool.

14. A system comprising:
multiple processing units;
an input memory pool accessible to the multiple processing units; and
a video encoding management tool adapted to perform acts that include:
receiving pictures for video;
organizing the received pictures as multiple groups of pictures (GOPs), each group of pictures (GOP) of the multiple GOPs including one or more of the received pictures wherein the received pictures are split into non-overlapping GOPs having GOP boundaries, the GOP boundaries being set based on scene changes and/or expected motion estimation efficiencies;
adjusting one or more settings of the video encoding management tool to trade off latency, processing unit utilization, compression efficiency or switching granularity, wherein the settings include GOP size and number of GOPs to encode in parallel; and
transferring at least some of the received pictures to the input memory pool for multiple bitrate (MBR) video encoding using the multiple processing units in parallel, wherein, for each GOP of the multiple GOPs, the MBR video encoding includes encoding the GOP as multiple streams with different rates, and wherein at least two of the multiple GOPs are made available in the input memory pool for encoding in parallel to each other;
wherein motion vectors from the encoding of a first stream of the multiple streams for the GOP are used to guide motion estimation during the encoding of a second stream of the multiple streams for the GOP so as to reduce encoding time; and
wherein determining a GOP size is based at least in part on a value that balances compression efficiency and switching granularity, wherein the number of GOPs to encode in parallel also depends at least in part on the determined GOP size.

15. The system of claim 14 wherein the acts of the video encoding management tool further include, for each GOP of the multiple GOPs, assigning the GOP to one or more of the multiple processing units, and wherein the encoding the GOP includes encoding each of the multiple streams for the GOP using a multi-threaded video encoding implementation that executes on the one or more of the multiple processing units for the GOP.

16. The system of claim 14 wherein, for each GOP of the multiple GOPs, the encoding the GOP includes sequentially encoding each of the multiple streams for the GOP according to layer-to-layer dependencies for the GOP.

17. The system of claim 14 further comprising a network connection, wherein the acts of the video encoding management tool further include transmitting at least some of the received pictures to another system with one or more processing units for MBR video encoding.

* * * * *